…

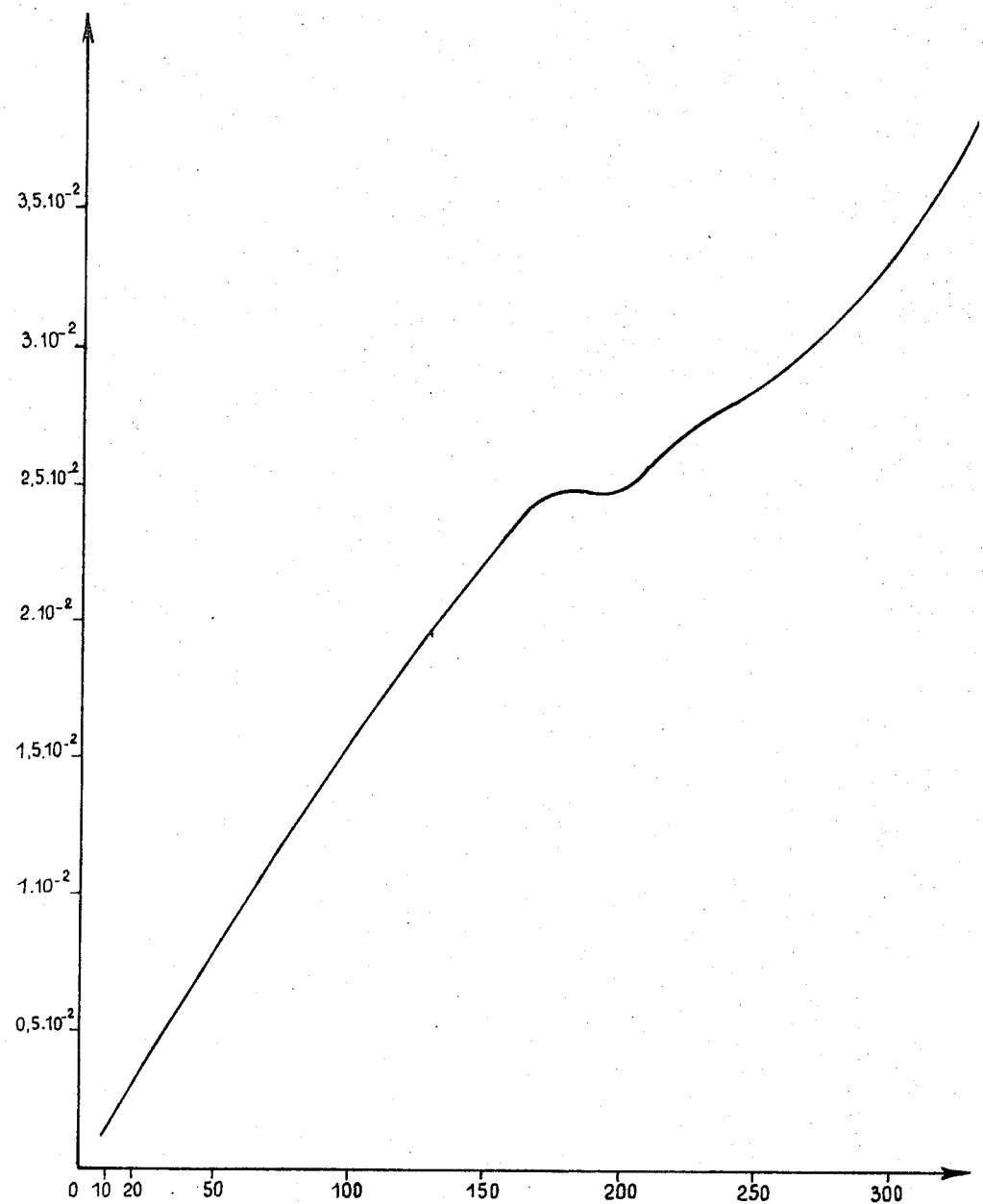

United States Patent Office 3,833,523
Patented Sept. 3, 1974

3,833,523
RIGID CELLULAR MATERIALS HAVING A GOOD MECHANICAL STRENGTH AT LOW TEMPERATURES
Henri Tariel, Rillieux, and Roger Guyon, Oullins, France, assignors to L'Air Liquide, Societe Anonyme pour l'Etude et l'Exploitation des Procedes Georges Claude and la Societe Anonyme dite: Pneumatiques, Caoutchouc Manufacture et Plastiques Kleber-Colombes
Continuation of abandoned application Ser. No. 105,044, Jan. 8, 1971. This application Sept. 7, 1972, Ser. No. 286,912
Claims priority, application France, Feb. 13, 1970, 7005191
Int. Cl. C08g 22/44
U.S. Cl. 260—2.5 R
7 Claims

ABSTRACT OF THE DISCLOSURE

Rigid cellular materials with closed cells, prepared from polyvinyl chloride and manufactured by copolymerising at least one vinylidene monomer with an ethylenic carboxylic acid anhydride, by grafting this copolymer on the chains of a polyvinyl chloride, by crosslinking with one another the grafted copolymers, by formation of two amide functions between the isocyanate groups of a mixture of polyisocyanates and the acid anhydride groups and by decomposing a blowing agent by heat during all these operations; the mixture of polyisocyanates contains at least 50% by weight of hexamethylene diisocyanate.

They can be used with advantage for all the applications where the rigid cellular material must be excellent as regards its capacity for elongation at very low temperatures.

---

This is a division of application Ser. No. 105,044, filed Jan. 8, 1971, now abandoned.

The present invention has for its object an improvement in the processes carried out for obtaining rigid cellular materials having closed cells, starting with polyvinyl chloride. It is essentially applicable to the process described in U.S. Pat. 3,200,089, and according to which a rigid cellular material is obtained by the following steps:

(1) A polyvinyl chloride, a polyisocyanate, at least one vinylidene monomer polymerisable by radical reaction, an ethylenic carboxylic acid anhydride polymerisable with the said monomer and a blowing agent decomposing under the action of heat are mixed.

(2) The mixture obtained is heated in a mould under pressure; during this operation, the blowing agent, under the effect of the heat, produces a gas and thus there is formed an embryonic cellular product.

(3) The mould is cooled under pressure and the embryonic cellular product which is obtained is removed from the mould.

(4) The embryonic product is heated in the presence of water or steam, this resulting in a hardening of the cellular material.

According to U.S. Pat. No. 3,308,074, the third step can be effected under heat and the removal from the mould according to this patent is effected at a temperature which is between 90 and 140° C.

The products obtained possess generally the following structure:

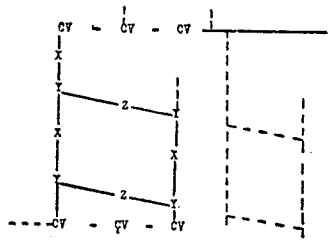

in which CV represents the pattern of the polyvinyl chloride chains, Y represents an ethylenic carboxylic acid anhydride grafted on the polyvinyl chloride chains by means of a vinylidene monomer X, and Z is a polyisocyanate, of which at least two isocyanate groups have each formed an amide function with an acid anhydride group. The materials conforming to the above formula thus have a three-dimensional crosslinked structure. This crosslinking is obtained by bridging the grafted chains on the polyvinyl chloride chains.

The crosslinked structure of these cellular materials and also their closed cellular structure give them interesting physical properties which permit them to be used for numerous purposes. For example, they have a very low thermal conductivity, they are steamtight, they have a good dimensional stability, a low specific weight and they have good resistance to the usual solvents. Hence, they have been used for very many different purposes, such as heat insulation, soundproofing, etc.

The cryogenic applications of these materials have been described in U.S. Pat. No. 3,578,541.

According to this latter patent application, it has been shown that the materials described in U.S. Pat. No. 3,200,089 were in addition tight to air and its constituents at cryogenic temperatures, that is to say, a temperatures essentially lower than —90° C. These materials have also been utilised for heat insulation of tanks, such as those of launch vehicles, containing a very cold liquid such as liquid hydrogen, and confronted with the problems of cryo-pumping the gases of the air. The U.S. Pat. No. 3,578,541 has also described a heat insulation process, which consists essentially in adhesively bonding the cellular materials in question to the external face of the walls of tanks. This process essentially permits obviating the phenomena of cryopumping of the gases of the air through the insulating structure on to the wall of the tank.

The process described in U.S. Pat. No. 3,578,541 is only satisfactory if the materials used have a good mechanical strength at cryogenic temperatures.

In actual fact, for example, in the case of a rigid and tight cellular material adhesively bonded at ambient temperature to the metal wall of a liquid hydrogen tank, an elongation of the insulating materials is produced in the region of the bonding zone when the reservoir is brought to 20° K.; this is due firstly to the differential thermal contraction of the two materials (insulator and metal) and to the deformaion induced in he insulating material, through the metal wall, by the pressurisation and/or other mechanical forces imposed on the tank.

In certain cases, this deformation can be important; thus, as regards the cryogenic tanks of launch vehicles, the metal wall (generally aluminium) has a relatively small thickness and the pressurisation of the said material is shown by a supplementary stress at the location of the insulating material. Moreover, at low and very low temperatures, the elongation imposed on the insulating material exceeds or provides the danger of exceeding its elongation at break for the temperatures in question and it hence becomes necessary for the elongation at break of the insulating material to be higher, at the said temperatures, than the algebraic sum of the two previously mentioned effects.

In this respect, it was shown by numerous tests that the materials described in U.S. Pat. 3,200,089 had a low mechanical strength at low and very low temperatures and that in particular its elongation at break could not exceed 0.9% at 20° K. This latter value fixed the maximum value of the mechanical forces which could be imposed on the metal wall of a cryogenic tank. In addition, for certain of the applications defined in Pat. No. 3,578,541 (launch vehicle tanks), this value could be lower than the mechanical forces exerted on the tank wall (pressurisation, vibrations, etc.) and there was then the danger of the insulating material being damaged and of no longer fulfilling the function for which it had been chosen and used.

One object of the present invention is therefore a heat-insulating material which is tight to gases at low temperatures and has a good mechanical strength for the said temperatures.

Another object of the invention is to improve the elongation at break, at low temperatures, of the rigid cellular materials defined in U.S. Pat. 3,200,089.

Another object of the invention is to improve the said materials, so that their elongation at break is greater than 0.9% at 20° K.

Another object of the invention is concerned with gas-tight insulating materials which are capable of being fixed at ambient temperature by adhesives to the external face of the wall of a cryogenic tank, and resistant to cold, and to the important mechanical forces which are transmitted to it through the said wall.

Another object of the present invention is to obtain an insulating material capable of being used with great reliability for thermally insulating cryogenic tanks of launch vehicles (hydrogen, liquid oxygen, etc.).

According to the invention, it has been found that, using the process defined in U.S. Pat. 3,200,089, possibly improved according to U.S. Pat. 3,308,074, but using a polyisocyanate formed by a mixture of at least 50% by weight of hexamethylene diisocyanate, the mechanical strength at low and very low temperatures of the rigid cellular materials obtained is improved.

It was also found that, using the same process, but employing a quantity of ethylenic carboxylic anhydride which is between 5 and 20% by weight of the initial mixture, the said mechanical strength is also improved.

It was in particular found that, by using the processes as defined above, it was possible to obtain rigid cellular materials with elongations at break at 20° K. which are between 1.4% and 1.8% in respect of specific weights of about 50 kg./m.$^3$, plus or minus 5 kg./m.$^3$.

It was unexpectedly found that, by using a process according to the invention, the other physical properties of the final material are not substantially modified. In particular, for specific weights of about 50 kg./m.$^3$, plus or minus 5 kg./m.$^3$ the new rigid cellular materials which are obtained maintain a mean thermal expansion coefficicent of $36 \cdot 10^{-6}/°$ K. between 20° K. and 300° K., to within 10%. This makes it possible to increase at 20° K. the limit of the admissible stresses on a metal wall (subject to the value of the elasticity limit of the metal) on which the rigid cellular material is fixed, because the gain obtained on the elongation at break of the said material is not consumed by an increase of the differential thermal contraction of insulator and metal, resulting from an increase in the thermal expansion coefficient of the said insulator. It then becomes possible to use the rigid cellular material with a high degree of reliability in numerous cryogenics applications, such as described in Patent Application Ser. No. 602,324.

It has also been found that during admixture of the hexamethylene diisocyanate and toluene-2,4-diisocyanate, the components exhibit much less irritant and tearing properties than when pure hexamethylene diisocyanate is used in admixture with the other components or when pure toluene-2,4-diisocyanate is used in admixture with the other components.

The polyisocyanate which is employed is preferably a mixture of two constituents, of which one is toluene-2,4-diisocyanate. In order to obtain the best advantages of the present invention, the quantities of the different constituents of the initial mixture will be hereinafter specified.

The quantity of polyvinyl chloride to be employed depends on the final specific weight which it is desired to obtain. For specific weights of the final product of about 50 kg./m.$^3$, plus or minus 5 kg./m.$^3$, the initial mixture comprises between 45 and 55% by weight of polyvinyl chloride.

The quantity of polyisocyanate which is used depends on the composition of the mixture being employed, and also on the nature of the constituents of the said mixture. The initial mixture generally comprises between 25 and 35% by weight of the said polyisocyanate.

The ethylenic carboxylic acid anhydride being used can be acrylic anhydride, itaconic anhydride, maleic anhydride, etc. It is necessary to use a quantity of anhydride smaller than that generally employed; this is between 5 and 20% by weight, and the anhydride being used is preferably maleic anhydride.

The vinylidene monomers employed according to the invention contain at least one $CH_2=C<$ grouping, and can be used in admixture. Among these monomers, it is possible to mention butadiene, chloroprene, myrcene, vinyl chloride, methacrylate, vinyl pyridine, ethylene, vinyl acetylene and styrene. The quantity of vinylidene monomer varies between 1 and 10% by weight of styrene is preferably used.

For example, a rigid cellular material according to the invention can be manufactured by a mixture having one of the compositions set out in the following table being heated to 180° C. for 8 minutes:

| | Percent by weight | | | | | |
|---|---|---|---|---|---|---|
| Polyvinyl chloride | 52.5 | 52.5 | 49.5 | 51.5 | 51.5 | 51.5 |
| Toluene-2,4-diisocyanate | 10 | 11 | 10 | 10 | 13 | 0 |
| Hexamethylene diisocyanate | 21 | 17 | 21 | 21 | 15 | 28 |
| Styrene | 5 | 5 | 5 | 5 | 5 | 5 |
| Maleic anhydride | 10 | 13 | 13 | 11 | 14 | 14 |
| $\alpha,\alpha'$Azo-isobutyro-nitrile | 1 | 1 | 1 | 1 | 1 | 1 |
| Azodicarbonamide | 0.5 | 0.5 | 0.5 | 0.5 | 0.5 | 0.5 | in a mould under pressure, by cooling the mould to 100° C. for 15 minutes, by reheating it to 130° C. for 15 minutes, by removing the resulting product from the mould at 130° C. and by heating the said product in the presence of steam.

The accompanying drawing represents the variations of the heat conductivity coefficient of a material according to the invention, expressed as watts per metre and per degree K, as a function of the temperature, expressed in degrees K.

The different physical properties of the materials according to the invention can be set out as follows:

Specific weight.—The materials according to the invention can be obtained in any specific weight which is between 25 and 90 kg./m.$^3$. The materials according to the invention preferably have a mean specific weight of 50 kg./m.$^3$, varying by plus or minus 5 kg./m.$^3$ from this value.

All the other properties have been established for this specific weight:

Coefficient of thermal expansion.—It has a mean value between 300° K. and 20° K. of $36 \cdot 10^{-6}/°$ K.

Resistance to heat.—The materials according to the invention start to become degraded from 120° C. Beyond this temperature, they are softened and lose the major part of their mechanical properties.

Coefficient of heat conductivity.—The value of this coefficient as a function of the temperature appears in the Figure.

Gas permeability.—The materials according to the invention are impermeable to gases and particularly to the gases in air.

As regards mechanical characteristics, they are indicated for a preselected displacement value equal to 0.5 cm. per minute:

Ultimate tensile strength.—The following values are given in tension: 7 to 13 bars at 300° K.; 7 to 15 bars at 20° K.

The dispersion of these values is essentially due to the dispersion of the specific weights. In first approximation, a linear relation exists between the specific weight and the strength in the range of specific weights which are between 45 and 55 kg./m.³

Elongation at break.—The values obtained in tension are between 12% and 16% at 300° K., and 1.4% and 1.8% at 20° K. As the value of the elongation at break of the cellular materials used prior to the invention were as a maximum equal to 0.9% at 20° K., this elongation has consequently been improved by 60 to 100% in accordance with the invention.

What we claim is:

1. A rigid cellular material consisting essentially of polyvinyl chloride on which are grafted side chains of copolymers of at least one vinylidene monomer and one ethylenic carboxylic acid anhydride polymerizable with the said monomer, the said side chains being cross-linked with one another by at least two amide functions resulting from the reaction between the isocyanate groups of a polyisocyanate and the acid anhydride groups of the said anhydride, the said polyvinyl chloride being present in the proportion of 45 to 55% by weight, said vinylidene monomer being present in the proportion of 1 to 10% by weight, the said anhydride being present in the proportion of 5 to 15% by weight, the said polyisocyanate being present in the proportion of 25 to 35% by weight and consisting essentially of a mixture of hexamethylene diisocyanate and toluene-2,4-diisocyanate in which the weight ratio of toluene-2,4-diisocyanate to hexamethylene diisocyanate is about 10:21 to 13:15, said cellular material having an elongation at brbeak at 20° K. which is between 1.4% and 1.8% and a specific weight of 45 to 55 kg./m.³

2. A rigid cellular material according to claim 1, having a mean thermal expansion coefficient between 20° K. and 300° K. of $36 \times 10^{-6}$ per ° K., ±10%.

3. A rigid cellular material according to claim 1, wherein said vinylidene monomer is styrene.

4. A rigid cellular material according to claim 1, wherein said ethylenic carboxylic acid anhydride is maleic anhydride.

5. A molding composition for producing a rigid and cross-linked cellular polyvinyl chloride having an elongation at break at 20° K. which is between 1.4% and 1.8% and a specific weight of 45 to 55 kg./m.³, consisting essentially of a blowing agent decomposing under the action of heat, 45 to 55% by weight of a polyvinyl chloride, 1 to 10% by weight of a vinylidene monomer, 5 to 15% by weight of an ethylenic carboxylic acid anhydride polymerizable with said monomer, and 25 to 35% by weight of a polyisocyanate consisting essentially of a mixture of hexamethylene diisocyanate and toluene-2,4-diisocyanate in which the weight ratio of toluene-2,4-diisocyanate to hexamethylene diisocyanate is about 10:21 to 13:15.

6. A composition according to claim 5, in which said vinylidene monomer is styrene.

7. A composition according to claim 5, in which said ethylenic carboxylic acid anhydride is maleic anhydride.

References Cited
UNITED STATES PATENTS

| | | | |
|---|---|---|---|
| 3,308,074 | 3/1967 | Landler et al. | 260—2.5 |
| 3,200,089 | 8/1965 | Landler et al. | 260—2.5 |
| 2,576,749 | 11/1951 | Carpentier | 260—2.5 |

DONALD E. CZAJA, Primary Examiner

E. C. RZUCIDLO, Assistant Examiner

U.S. Cl. X.R.

260—2.5 BE